Sept. 29, 1959     D. H. MITCHELL ET AL     2,906,199
METHOD OF PRINTING LABELS AND IMPRINTING APPARATUS THEREFOR
Filed Nov. 25, 1952     9 Sheets-Sheet 1

FIG. 1.

*INVENTORS*
DONALD H. MITCHELL
FREDERICK G. MUEHLBERGER
& GUSTAVE A. HAEDERER
BY
ATTORNEYS

Sept. 29, 1959  D. H. MITCHELL ET AL  2,906,199
METHOD OF PRINTING LABELS AND IMPRINTING APPARATUS THEREFOR
Filed Nov. 25, 1952  9 Sheets-Sheet 2

FIG. 2.

INVENTORS
DONALD H. MITCHELL
FREDERICK G. MUEHLBERGER
& GUSTAVE A. HAEDERER
BY
ATTORNEYS

FIG. 3.

INVENTORS
DONALD H. MITCHELL
FREDERICK G. MUEHLBERGER
& GUSTAVE A. HAEDERER
BY
ATTORNEYS

Sept. 29, 1959 D. H. MITCHELL ET AL 2,906,199
METHOD OF PRINTING LABELS AND IMPRINTING APPARATUS THEREFOR
Filed Nov. 25, 1952 9 Sheets-Sheet 4

FIG. 4.

INVENTORS
DONALD H. MITCHELL
FREDERICK G. MUEHLBERGER
& GUSTAVE A. HAEDERER
BY
ATTORNEYS

Sept. 29, 1959  D. H. MITCHELL ET AL  2,906,199
METHOD OF PRINTING LABELS AND IMPRINTING APPARATUS THEREFOR
Filed Nov. 25, 1952  9 Sheets-Sheet 5

FIG. 5.

INVENTORS
DONALD H. MITCHELL
FREDERICK G. MUEHLBERGER
& GUSTAVE A. HAEDERER
BY
ATTORNEYS

Sept. 29, 1959 D. H. MITCHELL ET AL 2,906,199
METHOD OF PRINTING LABELS AND IMPRINTING APPARATUS THEREFOR
Filed Nov. 25, 1952 9 Sheets-Sheet 6

INVENTORS
DONALD H. MITCHELL
FREDERICK G. MUEHLBERGER
& GUSTAVE A. HAEDERER

BY
ATTORNEYS

Sept. 29, 1959     D. H. MITCHELL ET AL     2,906,199
METHOD OF PRINTING LABELS AND IMPRINTING APPARATUS THEREFOR
Filed Nov. 25, 1952     9 Sheets-Sheet 7

FIG. 7.

*INVENTORS*
DONALD H. MITCHELL
FREDERICK G. MUEHLBERGER
& GUSTAVE A. HAEDERER
BY
ATTORNEYS

Sept. 29, 1959  D. H. MITCHELL ET AL  2,906,199
METHOD OF PRINTING LABELS AND IMPRINTING APPARATUS THEREFOR
Filed Nov. 25, 1952  9 Sheets-Sheet 8

INVENTORS
DONALD H. MITCHELL
FREDERICK G. MUEHLBERGER
& GUSTAVE A. HAEDERER

BY
ATTORNEYS

United States Patent Office

2,906,199
Patented Sept. 29, 1959

2,906,199

METHOD OF PRINTING LABELS AND IMPRINTING APPARATUS THEREFOR

Donald H. Mitchell, West Chester, and Frederick G. Muehlberger and Gustave A. Haederer, Philadelphia, Pa., assignors to Globe Ticket Company, Philadelphia, Pa., a corporation of Pennsylvania Application November 25, 1952, Serial No. 322,486

8 Claims. (Cl. 101—93)

This invention relates to a method of printing labels and imprinting apparatus therefor. The imprinting apparatus is contemplated as including means for printing price and/or identification labels adapted to be applied to packages of goods with both general and specific designations relating to the goods contained within the packages and the printing thereof immediately prior to the application of each individual label to a package. The general designation is a designation indicating broadly the type of goods being packaged and the specific designation is an indication of weight and/or price of the package or similar information specific to each individual package.

For example, the present practice in merchandising of food is to have meats and similarly handled foods cut and packaged in a dressing plant and supplied to retail stores for sale in individually weighed and priced packages. Each of these packages must bear a label stating the type of food enclosed within the package, the price of the food per unit of weight, the weight of the food contained within the particular package and the total price of that particular package of food.

It will be evident that a merchandising concern such as a large food distributing company would require a great number of these labels for application to their various meats and other foods. Heretofore, these labels have been preprinted with designations of the foods sold by the market, for example, stewing chicken, hamburger, dried beef, sharp cheese and the like. It will be evident that, if these labels are preprinted with indications of the type of food to which the labels are to be applied, it is necessary for the market to have a great inventory of different labels. Furthermore, there is the possibility of fraud by virtue of the availability of these labels to numerous employees.

The packaging and labelling of these foods is accomplished in a packing house in which operators weigh each individual package and, by means of suitable calculating or typewriting machines, or by hand, print on each of the labels designations indicating the price per pound, the number of pounds and the total price of each particular package of food and apply a specifically printed label on each package.

It is an object of the present invention to provide a method and apparatus for printing on labels the general designation of the type of goods being packaged and to accomplish this printing in conjunction with the printing of the weight and price or other specific indicia relating to each particular package. The printing apparatus includes a removable printing plate by means of which the operator may readily change the designation being applied to a strip of labels being fed to the calculating machine which he is using. Thus it will be necessary for the packer to have only a single supply of labels, the labels being blank in the area adapted to receive the designation of the food to which the label will be ultimately applied, the desired designation being applied by the label imprinting device to the label immediately prior to the package of the label through the operator's calculating or other specific indicia imprinting machine.

For example, an operator may be positioned beside a conveyor belt carrying packaged stewing chickens. The operator will be weighing the packages and applying to stewing chicken labels the weight, the price per pound and the total price of each package, and then applying the labels to the packages. It will be evident that the operator will be able to determine in advance when the last of the stewing chickens is passing along the conveyor belt and that the stewing chickens are followed, for example, by dried beef. When the imprinting apparatus has printed a sufficient number of stewing chicken labels, the operator will replace the stewing chicken printing plate in the imprinting apparatus with a dried beef printing plate, and thus, without the necessity of securing other labels or feeding a new strip of labels through the machine, or other interruptions, the operator may immediately proceed to apply weight, unit cost and total price figures to dried beef labels when he begins handling the dried beef.

While throughout this disclosure reference is made to the packaging of foods, it will be evident that the invention may be applied to numerous types of goods such as hardware or any other type of article which requires counting, weighing or other manner of grouping and groups of the articles of a general type packaged and identified, generally and specifically, by printing on a label.

It is a further object of this invention to provide an apparatus for printing labels of a strip with the general indicia relating to the type of goods to which the labels are to be applied and including means for severing printed labels from the strip and positioning the printed labels to be received by specific indicia imprinting means.

These and other objects of the invention will become apparent from the following description when read in conjunction with the following drawings, in which.

Figure 1:
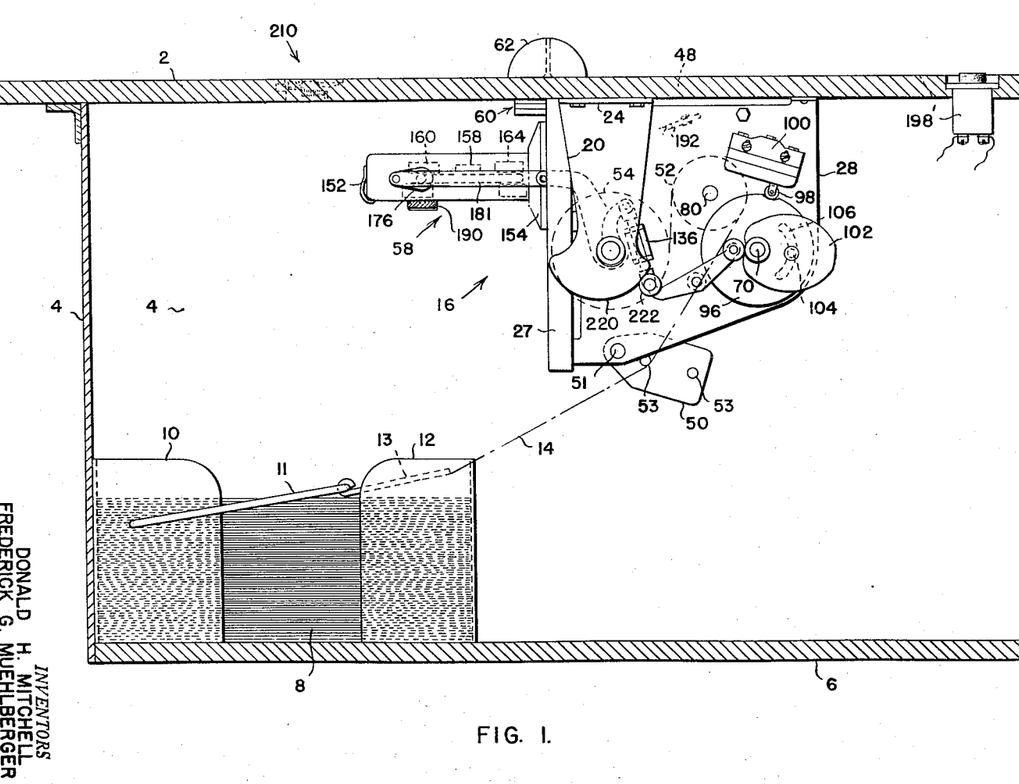
Figure 1 is an elevation partly in section showing the general indicia imprinting apparatus.

In Figure 1 there is shown a counter or table top 2 below which there is supported an enclosure 4 having a bottom plate 6. A fan-folded label strip 8 is positioned within retainer plates 10 and 12 mounted on the bottom plate 6. A U-shaped wire member 11 having a metal plate 12 hingedly attached thereto is hingedly mounted on the retainer plate 10 and provides a label strip guide and tensioning means.

A label strip 14 is drawn out of the fan-folded label strip storage means and is carried up into the imprinting machine indicated generally at 16 in Figure 1.

Figure 3:
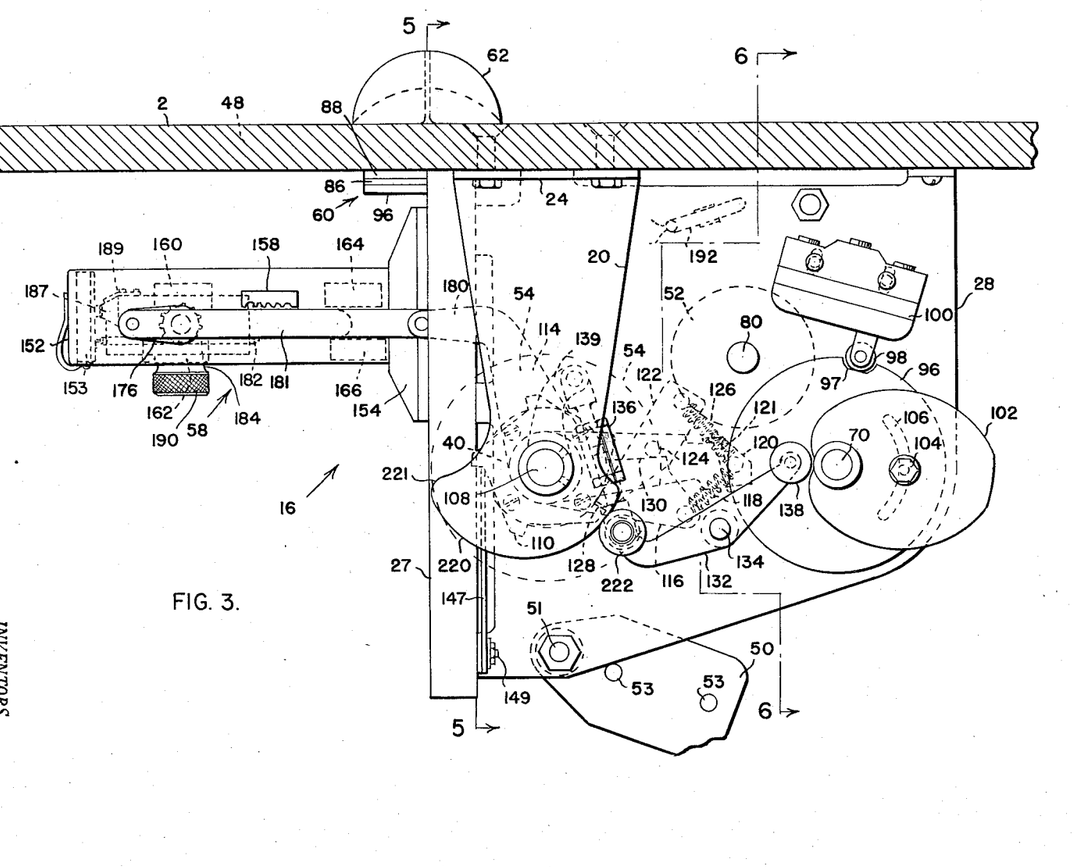
Figure 3 is an enlarged showing of a portion of the apparatus shown in Figure 1.
Figure 5:
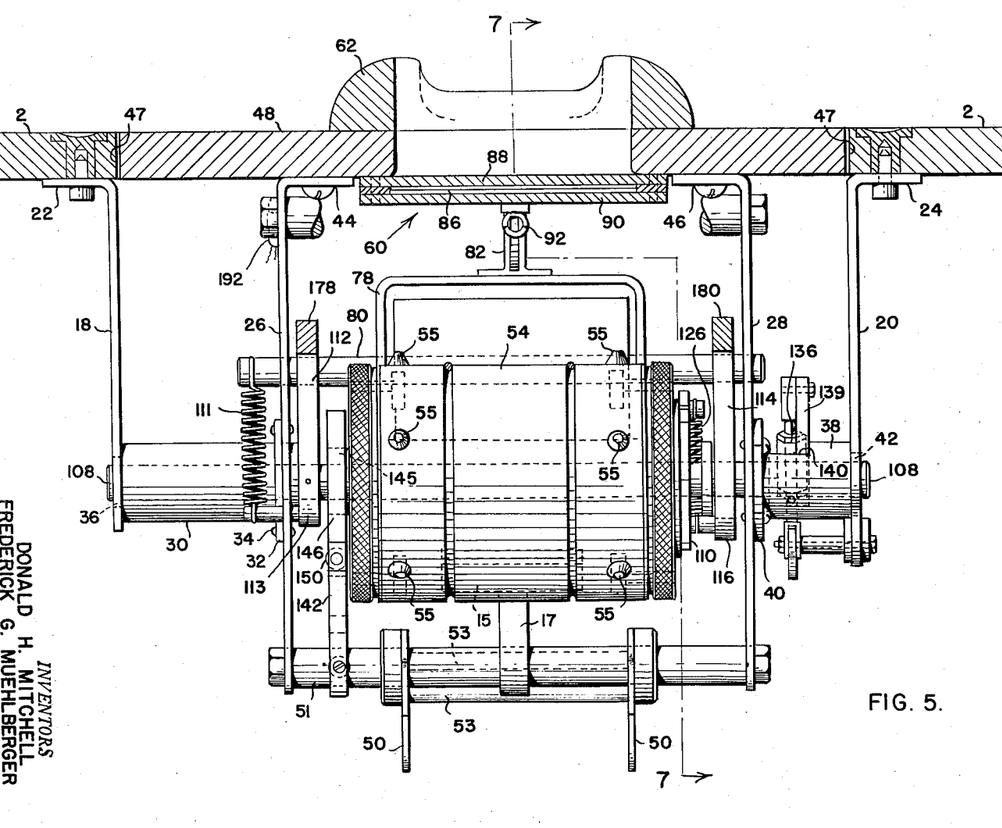
Figure 5 is a section through the apparatus taken on the trace 5—5 of Figure 3.

As shown in Figures 3 and 5, the imprinting apparatus includes a pair of hanger members 18 and 20 having right angle formed flanges 22 and 24 respectively at the upper ends thereof which are attached to the table top 2 by suitable fastening means.

The imprinting apparatus also includes a pair of side plates 26 and 28. A bushing 30 having a flange 32 extending from one end thereof is attached to the side plate 26 by means of suitable rivets 34. A bushing 38 having a flange 40 at one end thereof is similarly attached to the side plate 28. The outer end of the bushing 30 is provided with a reduced diameter portion 36 which is adapted to enter a bore in the hanger member 18. Similarly, the bushing 38 is provided with a reduced diameter outer end portion 42 which is adapted to be mounted within a bore in the hanger member 20. Thus the bushings 36 and 38 on the side plates 26 and 28 are supported by the hanger members 18 and 20. The upper ends of the side plates 26 and 28 are formed with inwardly turned flanges 44 and 46, respectively, to which there is attached a panel 48 which is adapted to be inserted within a cutout 47 in the counter or table top 2. A vertically extending panel 27 is attached to the left side of the side plates 26 and 28 as viewed in Figures 3 and 7 and extends for substantially the entire vertical length of the side plates.

A rod 51 extends between and is mounted in the side plates 26 and 28. Guide plates 50 are supported by the rod 51 and carry rods 53. The label strip 14 is drawn upwardly between the guide plates 50 and the rods 53 extending therebetween and passes up and around a guide roller 52. The label strip after passing around the guide roller 52 passes around a pin bearing drum 54 and under a guide plate 56. The label strip thereafter passes upwardly adjacent to the left-hand face of the vertical panel 27, beneath imprinting means indicated generally at 58 through cutoff means indicated generally at 60 and up into a severed label positioning means 62 wherein the severed label is retained by the action of a ball and spring detent arrangement indicated at 64 which is provided to prevent the label from dropping back into the apparatus after it has been severed from the strip. The label strip is urged into position against the drum 54 by a pressure pad 15 which is supported by an arm 17 mounted on the shaft 51 and urged to rotate in a counterclockwise direction thereon by suitable spring means.

Figure 6:
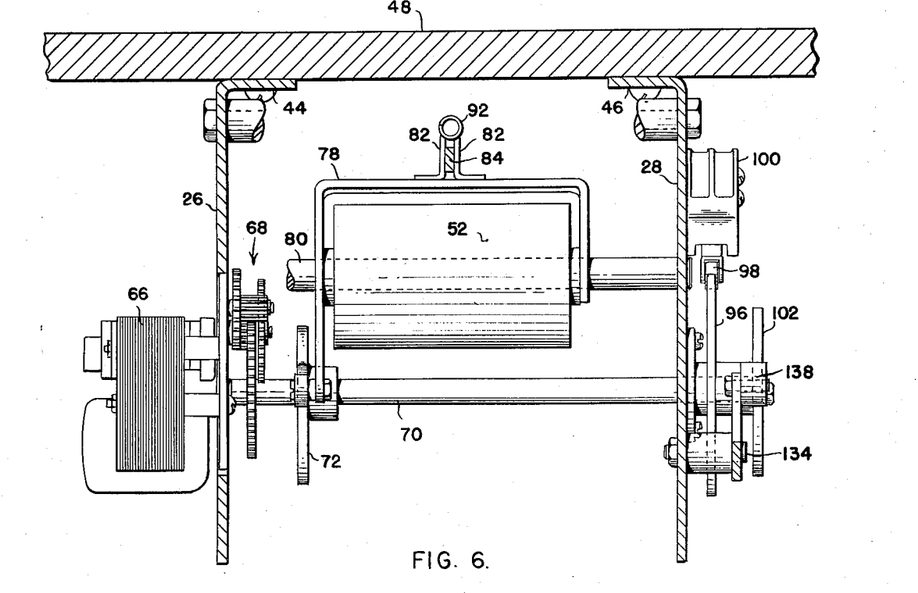
Figure 6 is a section through the apparatus taken on the trace 6—6 of Figure 3.

More specifically, the imprinting apparatus includes a driving motor 66 which is adapted, through reducing gears shown generally at 68 shown in Figure 6, to drive a shaft 70 which extends between and is mounted in the side plates 26 and 28. A cam 72 is affixed to the shaft 70. A cam follower 74 responsive to rotation of the cam 72 is affixed to an arm 76 which is an extension of one leg of a stirrup member 78 which is rotatably mounted on a shaft 80 extending between the mounting plates 26 and 28. The label strip guide roller 52 previously referred to is also rotatably mounted on the shaft 80 and is positioned between the legs of the stirrup member 78. A pair of angle members 82 mounted on the upper portion of the stirrup member 78 provides a pivotal mounting for a rod 84 which is provided to actuate the cutoff knife assembly indicated generally at 60 in Figure 7.

The cutoff knife assembly includes a sliding knife blade 86 which is mounted between retainer plates 88 and 90. The knife blade 86 is actuated by the rod 84. A spring 92 is connected between one of the angle plates 82 and a member 94 attached to the lower surface of the guide plate 90. It will be evident that rotation of the cam 72 will cause the stirrup member 78 to rotate about the shaft 80 and to either draw the knife blade 86 back away from the label strip against the urging of the spring 92 or, alternately, permit the spring 92 to draw the stirrup member to the left, as viewed in Figure 7, thereby pushing the knife blade 86 to the left toward the strip to cut a label from the label strip.

A cam 96 is attached to the right-hand end of the shaft 70, as viewed in Figure 6, adjacent to the outside surface of the mounting plate 28. The cam 96 is provided with a recess 97 in its periphery adapted to receive a cam follower 98 which is a part of an electrical switch assembly 100. The cam 96 controls the cycle of operation of the imprinting apparatus, the termination of the cycle being determined by the engagement of the cam follower 98 with the recess 97 whereupon the switch assembly 100 is actuated to open the circuit through the driving motor 66 which will be hereinafter more fully described.

A main operating cam 102 is mounted on the extreme right-hand end of the shaft 70 as viewed in Figure 6. The cam 96 is provided with an arcuate slot 106 and the cam 102 which is rotatably mounted on the shaft 70 is locked in position with respect to the cam 96 by means of a nut and bolt 104 which is adapted to pass through a suitable bore in the cam 102 and through the slot 106 in the cam 96. By this means the position of the main operating cam 102 can be adjusted with respect to the position of the stop cam 96.

A shaft 108 is mounted within the bushings 30 and 38 and extends through the apparatus. The label strip advancing roller or pin drum 54, previously described, is rotatably mounted on the shaft 108. The pin drum mounts a plurality of pins 55 which extend from the periphery of the drum and are adapted to engage cutouts in the label strip to advance the label strip. The number and location of the pins will depend upon the size of the labels and the location of the cutouts therein. Affixed to the right-hand end of the drum 54, as viewed in Figure 5, is a ratchet disc 110. A pair of arms 112 and 114 are rigidly attached to the shaft 108 one on each side of the pin drum 54 and adjacent to the side plates 26 and 28, respectively. These arms serve to actuate the printing mechanism as will be hereinafter described. The arm 114 is provided with an extended portion 116 which mounts one end of a spring 118. The opposite end of the spring 118 is attached to a member 120 which is rotatably mounted on the shaft 108. A pawl 122 is pivotally mounted on the member 120 by means of a pin 124. A spring 126 having its ends attached to the member 120 and the pawl 122 serves to urge the end 128 of the pawl into engagement with the teeth of the ratchet disc 110. The pin 124 extends above the member 120, as viewed in Figure 4, and is adapted to engage a surface 130 of the extension 116 of the arm 114.

A lever 132 is pivotally mounted on a pin 134 affixed to the mounting plate 28. The right-hand end of the lever 132, as viewed in Figure 3, supports a cam follower 138 which rides on the cam 102. The left-hand end of the lever 132 is pivotally connected to an adjustable link 136 which is in turn pivotally attached to one end of an arm 139. The opposite end of the arm 139 is rigidly attached to the shaft 108 in the region of the cutout portion 140 of the bushing 38.

A plate 142 is affixed to the lower portion of the vertically extending panel 27 by means of a screw 144. The upper portion of the plate 142 is provided with a bore through which extends a hub 145 of the pin drum 54. The plate 142 is cut as indicated at 148 from its exterior edge through to the bore through which the hub extends. A screw 150 extends through the portions of the plate adjacent to each side of the cut 148. By tightening the screw 150, the two portions of the plate adjacent to the cut are drawn together and the plate is brought to bear against the hub acting as a brake on the rotation of the drum 54 in the operation of the apparatus as will be hereinafter described.

Figure 4:
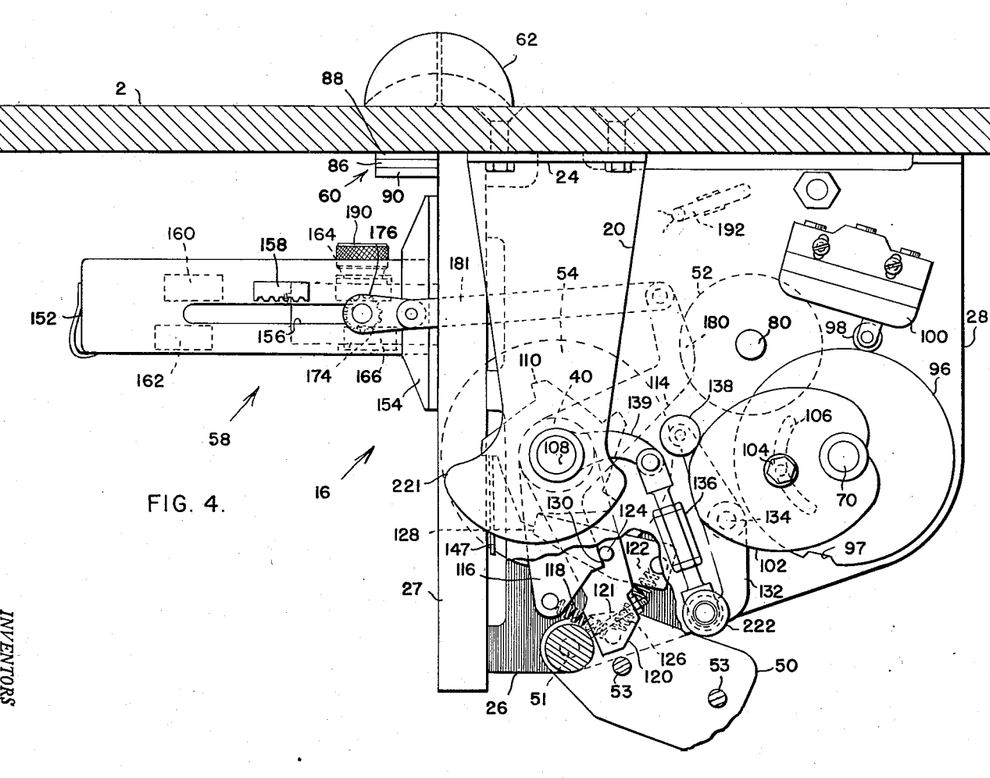
Figure 4 shows the apparatus of Figure 3 approaching the mid point of its operating cycle.
Figure 7:
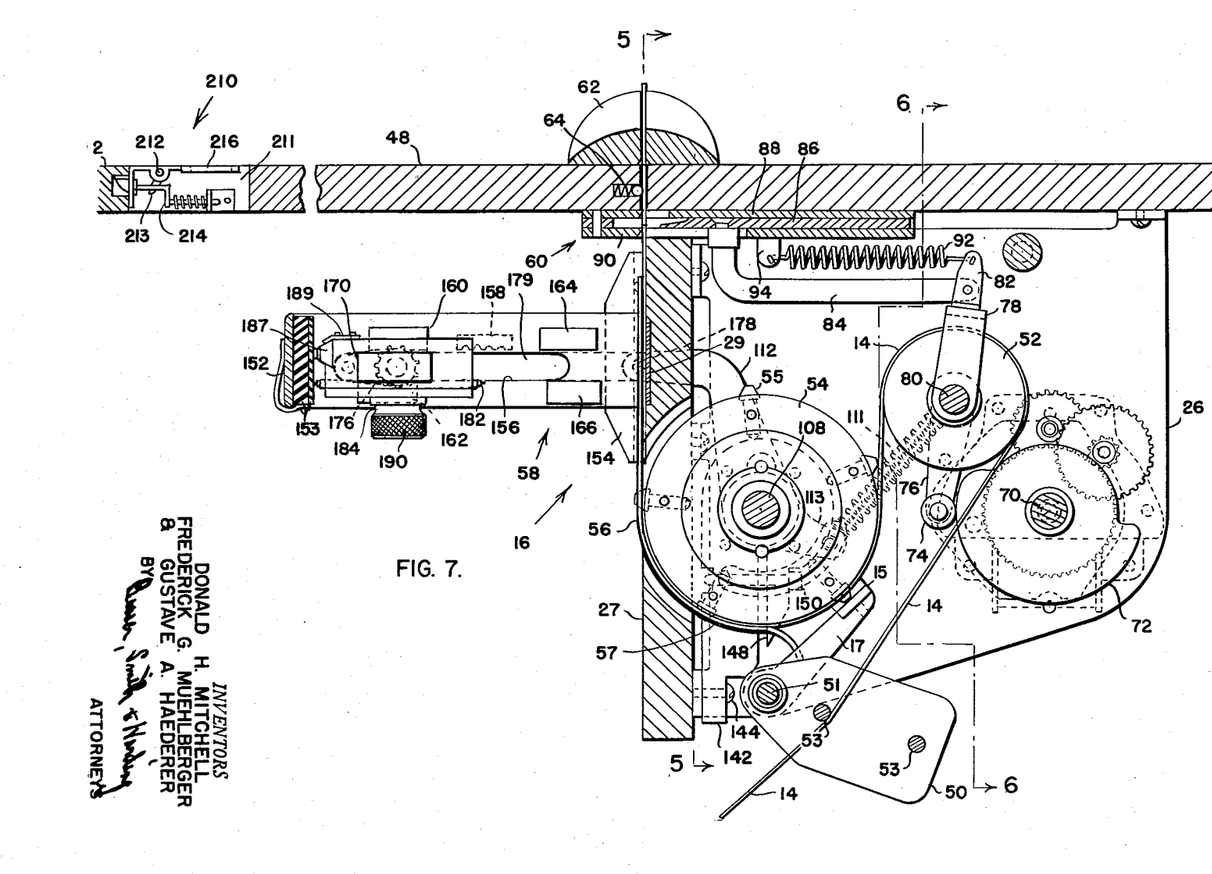
Figure 7 is a section through the apparatus taken on the trace 7—7 of Figure 5.
Figure 8:
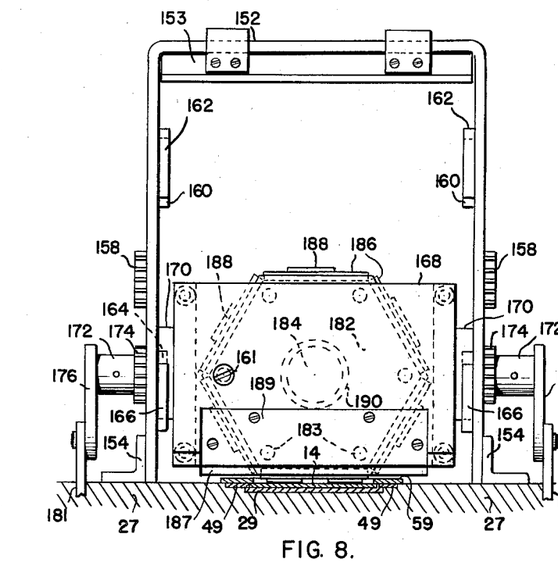
Figure 8 is a bottom view partly in section of a portion of the apparatus shown in Figure 4.
Figure 9:
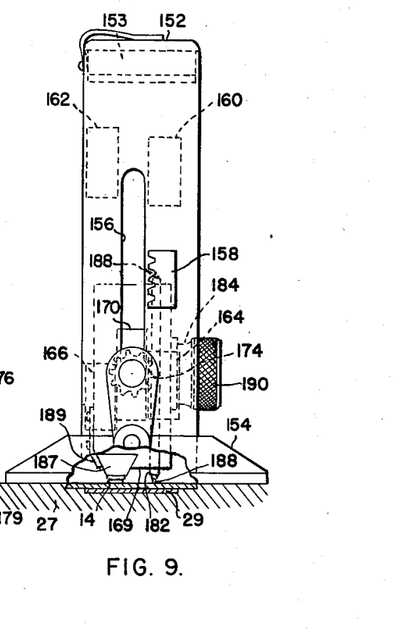
Figure 9 is a side view of the apparatus shown in Figure 8.

The printing plate carrying apparatus indicated generally at 58 in Figures 3, 4 and 7 is shown in detail in its operative position in Figures 8 and 9. This portion of the apparatus includes a U-shaped bracket 152 which is attached to the left side of the vertically extending panel 27 as viewed in Figure 3 by means of a pair of angle brackets 154. Each of the side legs of the U-shaped bracket 152 is provided with an elongated slot 156. A short length of rack gear 158 is mounted adjacent to the central portion of the slot 156 and on the exterior surface of each of the legs of the U-shaped bracket 152. On the interior surface of each of the legs of the U-shaped bracket 152 adjacent to the upper end of the slot 156, as viewed in Figures 8 and 9, there is provided a pair of blocks 160 and 162 in slightly staggered relation with the lower end of the block 162 on the side of the slot away from the rack gear terminating above the lower end of the block 160. Adjacent to the lower end of each of the slots 156 there is provided a similar set of blocks 164 and 166. The upper end of the block 166 on the side of the slot away from the rack gear terminates below the upper end of the block 164. It should be noted that, as viewed in Figure 9, the two blocks on the right-hand side of the slot, namely, 160 and 164, terminate more closely to the rack gear than the left-hand blocks 162 and 166. The same is true for the blocks on the opposite leg of the U-shaped bracket 152.

A box member 168 is positioned within the U-shaped bracket 152 and has spacer guide blocks 170 attached to each side thereof which are in slidable engagement with the interior surface of the legs of the U-shaped bracket. Stub shafts 172 are attached to and extend outwardly from each of the spacer blocks 170 and through a slot 156 in the U-shaped bracket. Each of the stub shafts mounts a gear 174 which is adapted to mesh with the rack gear 158 when moved into a position adjacent thereto. Attached to the ends of the stub shafts 172 are lever arms 176. The two lever arms 176 are pivotally attached to links 179 and 181. The opposite ends of the links 179 and 181 are attached to ends 178 and 180 of members 112 and 114, respectively, previously described as rigidly mounted on the shaft 108.

A printing plate mounting member 182 is rotatably mounted within the box structure 168 and includes a shaft portion 184 which extends through one side of the box structure 168. The plate mounting member 182 is provided with six faces 186 each of which mounts a printing plate 188. The shaft 184 extending through the side plate of the box structure 168 is provided with a knurled rim 190 by means of which an operator may rotate the printing plate carrying member 182 in order to position the desired printing plate adjacent to the portion of the label strip 14 which is in position to be printed.

A conventional ball and spring detent assembly indicated at 161 is mounted in one side of the box structure 168 which supports the printing plate mounting member 182. The ball and spring arrangement is adapted to cooperate with the six recesses 183 and thus serves to retain the printing plate mounting member 182 in its proper printing position when any one of its six faces have been rotated to a position adjacent to the label strip.

An ink pad 153 is mounted inside the upper portion of the U-shaped bracket 152, as viewed in Figures 8 and 9, and is adapted to be contacted by the printing plates when the printing plate mounting assembly is in the at rest position as will be described.

Each face 186 of the member 182 mounts a printing plate 188 which is adapted to print code indicia upon the labels as may be desired. For example, in the food industry this could be the day of the week on which foods are packaged and the six faces of the mounting member could bear printing plates indicating the days of the week.

One face 169 of the box structure 168 adjacent to the rotatable printing plate mounting member 182 is adapted to mount a replaceable printing plate 187 which is retained in position thereon by means of a spring clip 189.

This printing plate designates the general type of goods contained within the package to which the label is applied. For example, in the food industry typical general indicia would be roast beef, stewing chicken, etc.

The printing means is spaced from the cutoff knife assembly by a distance such that the line between adjacent labels of the strip falls between the general indicia printing plate 14 and the specific indicia printing plate 188. Thus, for example, the words "rib roast" are printed upon a first label, and then as the words "rib roast" are printed on the next succeeding label, the word "Monday" would be printed on the first label and at the same time a prior label would be severed from the first label.

An insert 29 is provided in the vertically extending panel 27 as a stationary platen upon which the printing is accomplished. The insert 29 may be a sheet of metal or other suitably hard deformation resistant material. A guide plate 56 has a lower portion 57 curved around the pin drum 54 as shown in Figure 7 and serves to maintain the label strip in association with the pin drum. The guide plate 56 also has an upwardly extending portion adjacent to and spaced from the left-hand face of the vertically extending panel 27 as viewed in Figure 7. The portion of the guide plate 56 passing beneath the printing means 58 has the central portion thereof cut away and thus provides a pair of legs 59, as shown in Figure 8, which are spaced from the panel 57 by means of spacer strips 49. The legs 59 of the plate 56 overhang the spacer strips 49 and thus serve to engage the edges of the label strip and position the label being printed.

Figure 10:
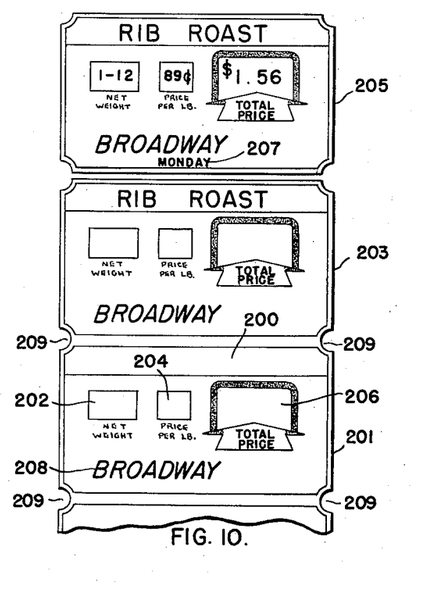
Figure 10 is a fragmentary showing of a ticket strip showing various stages of the printing thereof.

In Figure 10 there is shown a portion of a typical label strip 14 carrying a succession of preprinted labels each of which carries an indication, shown generally at 208, of the company producing or issuing the goods to be packaged. Each of the labels is also provided with a space, as indicated at 200, whereupon the general indicia imprinting device will print a designation indicating the type of goods to which the label is to be applied. If code designations are employed, the code designation will appear as illustrated by the word "Monday" at 207 on each of the labels printed.

The label is additionally provided with a space indicated generally at 202 whereupon the weight of the goods to be labelled may be printed, a space 204 whereupon the unit price of the goods may be printed and a space 206 whereupon the total price of the goods may be printed. These spaces may be accompanied by preprinted legends indicating the character of the numerals which are ultimately printed therein. The label 201 is shown as originally preprinted. The label 203 is shown printed only with the general goods identifying indicia and label 205 is shown printed with both the general goods identifying indicia and the specific indicia and is also shown severed from the label strip.

It will be evident that the particular form of the label is not an essential part of the invention. The label illustrated is of a type adapted to be used with either an imprinting calculating machine or a printing and weighing scale. The labels shown are provided with cut away portions 209 which are adapted to be engaged by the pins 55 of the pin drum in order to advance the label strip. It will be apparent that various forms of labels may be employed depending upon the type of apparatus employed for printing the specific indicia upon the labels after the general indicia printing is completed and prior to the application of each individual label to the goods to which it is to be applied.

Figure 11:
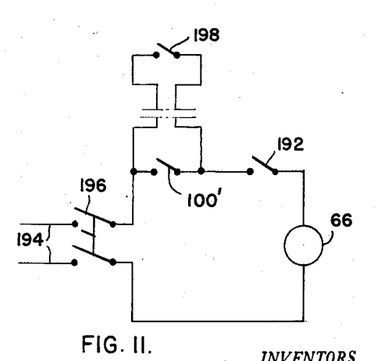
Figure 11 is a diagram of the electrical circuit involved in the imprinting apparatus.

The apparatus is adapted to be connected to a suitable power supply, as indicated at 194 in Figure 11, and may be connected thereto through any suitable disconnect switch as indicated at 196. A mercury switch 192 mounted on the side plate 28 and the motor 66 are connected in series relation and in series with the cycle switch contact 100'. An initiating switch 198 is employed to initiate the operation of the imprinting device and, as soon as the cam follower 98 of the cycle switch 100 rises out of the depression 97 in the cam 96, the contact 100' is closed permitting the sequence initiating switch 198 to be opened. At the end of a cycle of operation of the imprinting apparatus, the contact 100' is opened as a result of the follower 98 dropping into the recess 97 in the cam 96 and the operation of the motor 66 is terminated.

Figure 12:
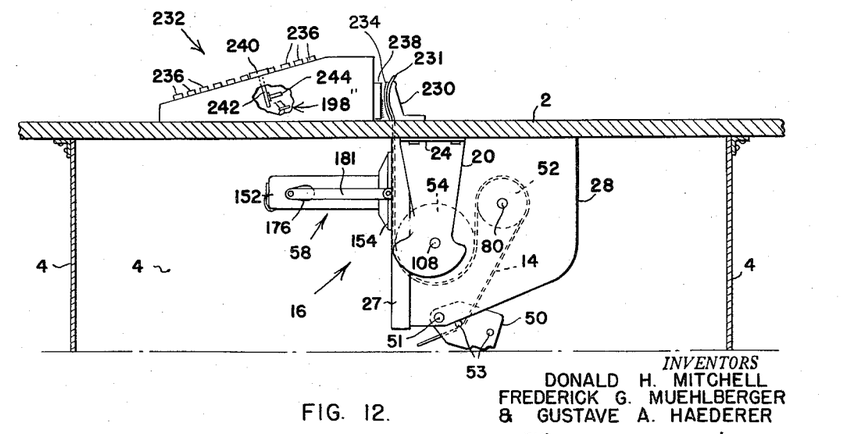
Figure 12 shows the general indicia imprinting apparatus when employed in conjunction with a specific indicia imprinting apparatus in accordance with the method disclosed herein.

The initiation switch may be a manually operated switch 198 positioned adjacent to the imprinting device such as the push-button switch 198' shown in Figure 1 or, alternately, may be a switch operated in conjunction with a weighing scale, a calculating machine such as contacts 198" shown in Figure 12, or other type of specific indicia imprinting apparatus which may be employed in conjunction with the general indicia imprinting apparatus. In this latter event it will be evident that the general indicia imprinting device can conveniently be automatically initiated for a cycle of operation upon each operation of the associated specific indicia imprinting apparatus. This type of operation will be described in connection with the apparatus shown in Figure 12.

The operation of the device may now be described. The fan-folded label strip indicated at 8 in Figure 1 is fed as shown at 14 into the imprinting mechanism indicated generally at 16. As the label strip 14 is drawn out of the magazine, the U-shaped wire 11 and the flap of metal 13 hingedly connected to the upper portion thereof provides a yieldable tension producing means for preventing the formation of slack and relieving sudden loads upon the label strip as it is drawn out of the retainers 10 and 12 and into the imprinting apparatus. The label strip passes between the guide plates 50 and the pair of rods 53 extending between the plates 50 which serve to further guide the label strip in its passage into the imprinting machine. The label strip passes over the roller 52 as previously described and around the pin drum 54. The pins 55 of the pin drum are adapted to enter the cutouts 209 in the sides of the label strip as shown in Figure 10. The pins 55 in their engagement with the cutouts 209 serve to advance the label strip when the drum 54 is rotated.

When it is desired to initiate an operation of the imprinting device, the initiating switch 198 will be closed. As has been previously described, this may be a push button mounted conveniently adjacent to the general indicia imprinting apparatus or, alternately, may be a switch which is closed in conjunction with the operation of a weighing machine, a calculating machine, or similar apparatus employed for printing specific indicia upon each label before it is placed on a package. Upon closure of the switch 198, current will flow through the mercury switch 192 and the motor 66 causing the motor to operate and rotate the shaft 70. Rotation of the shaft 70 will cause the cams 72, 96 and 102 to rotate in a clockwise direction as viewed in Figures 3 and 7. Immediately upon the rotation of the shaft 70, the cam follower 98 of the cycle switch 100 rises out of the depression 97 and closes the contact 100'. Thereafter the remote initiation switch 198 may be opened and the sequence of operation of the imprinting device will continue. Rotation of the shaft 70 gives rise to rotation of the cam 102 which actuates the cam follower 138 and causes the lever member 132 to rotate in a counterclockwise direction about the pivot 134. This rotation causes the arm 132 to draw the link 136 and the arm 138 downwardly, as viewed in Figure 3, causing the shaft 108 to rotate in a clockwise direction as viewed in Figure 3.

Rotation of the shaft 108 in a clockwise direction causes the arms 114 and 112 to be rotated in a clockwise direction as viewed in Figure 3. As the arm 114 is rotated in a clockwise direction, the extension 116 thereof is similarly rotated and draws with it through the spring 118 the member 120 which is pivotally mounted on the shaft 108. This rotation of the member 120 causes the pawl 122, which is in engagement with the ratchet disc 110, to urge the ratchet disc to rotate in a clockwise direction, as viewed in Figure 3, thus rotating the pin drum 54 in a clockwise direction, as viewed in Figures 3 and 7, and thereby advancing the label strip. As the arm 139 rotates through approximately 76° of rotation, the arm 114 is rotated in a clockwise direction until the end of the screw 121 mounted in the member 120 engages the rod 51 whereupon, for approximately 4° more of the clockwise rotation of the arm 114 and its extension 116, the motion of the member 120 is arrested and the spring 118 is extended.

As the levers 114 and 112 are rotated from their position of rest, as indicated in Figures 3 and 7, to the position approaching their extreme clockwise position as indicated in Figure 4, the printing plate mounting member will be brought into operating position as shown in Figure 8. Referring again to Figures 3 and 7, when the apparatus is at rest the selected printing plates will be in a position against an inking pad 153 and, as the arms 112 and 114 commence their motion in a clockwise direction, the arms 179, 181 will draw the printing plate mounting assembly to the right, as shown in Figures 3 and 7, with the guide blocks 170 sliding between the blocks 160 and 162, thus the printing plate will part from the inking pad with a motion perpendicular thereto.

As this motion proceeds, the gears 174 will come into contact with the rack gear portions 158. At this point the guide blocks 170 will be free of the stationary blocks 162 whereupon the engagement of the rack gear 158 with the gears 174 will cause the printing plate mounting assembly to be rotated through 180° in the passage of the gears 174 along the rack gears 158. Rotation of the plate mounting means is arrested at the completion of 180° of rotation by contact of the guide blocks 170 with the stationary blocks 164.

For the remainder of the downward motion of the printing plate mounting member, the guide blocks 170 will move between the stationary blocks 164 and 166 and thus the printing plate will approach the label strip 14 with a linear motion perpendicular to the label strip. By proper adjustment of the adjustable link 136, the printing plates will be made to bear against the label strip with the desired amount of pressure.

It should be noted that the printing plates engage the label strip after advance of the label strip has been arrested by contact of the screw 121 in the arm 120 with the cross bar 51. Figure 4 shows the apparatus approaching the middle of its cycle with the printing plates in position immediately prior to bearing upon the label strip and the cam 102 rotated through approximately 165°.

During the remainder of the cycle of operation, the cam 102 moves from the position shown in Figure 4 to the position shown in Figure 3. During this motion, the pawl 122 slides back over the ratchet disc 110 and the detent finger 147 prevents retrograde rotation of the pin drum 54. As the cam 102 returns to the position shown in Figure 3, the cam follower 138 is held in engagement therewith by the action of a spring 111 which is connected between a pin mounted on an extension 113 of the arm 112 and the shaft 80. As the cam 182 rotates through this remaining portion of the cycle, the arms 112 and 114 will be rotated in a counterclockwise direction with the shaft 108, as viewed in Figures 3, 4 and 7. The arms 181 and 179 will move to the left, as viewed in Figure 4, and the printing plates will first move perpendicularly away from the label strip until the guide blocks 170 have passed clear of the stationary blocks 166 whereupon the gears 174 will again engage the rack gears 158 causing the printing plate mounting assembly to rotate until the guide blocks 170 engage the stationary blocks 160 whereupon continued travel of the arms 179 and 181 will cause the plate mounting assembly to move without rotation into engagement with the inking pad.

It should be noted that both the contact with the label strip and contact with the inking pad are accomplished without rotation of the printing plate, i.e., the motion of the printing plate immediately before and immediately after contact with both the label strip and the inking pad is perpendicular with respect thereto. Thus there is no wiping action and no smearing of the ink upon the label strip and there is no smearing or piling up of the ink along one edge of the printing plate as the plate engages or disengages the inking pad.

As the cycle of operation approaches completion and the cams 102 and 96 arrive at the positions shown in Figure 3, the cam follower 98 will fall into the recess 97 of the cam 96 thus actuating the contact 100' to open the circuit and arrest further operation of the driving motor 66.

Figure 2:
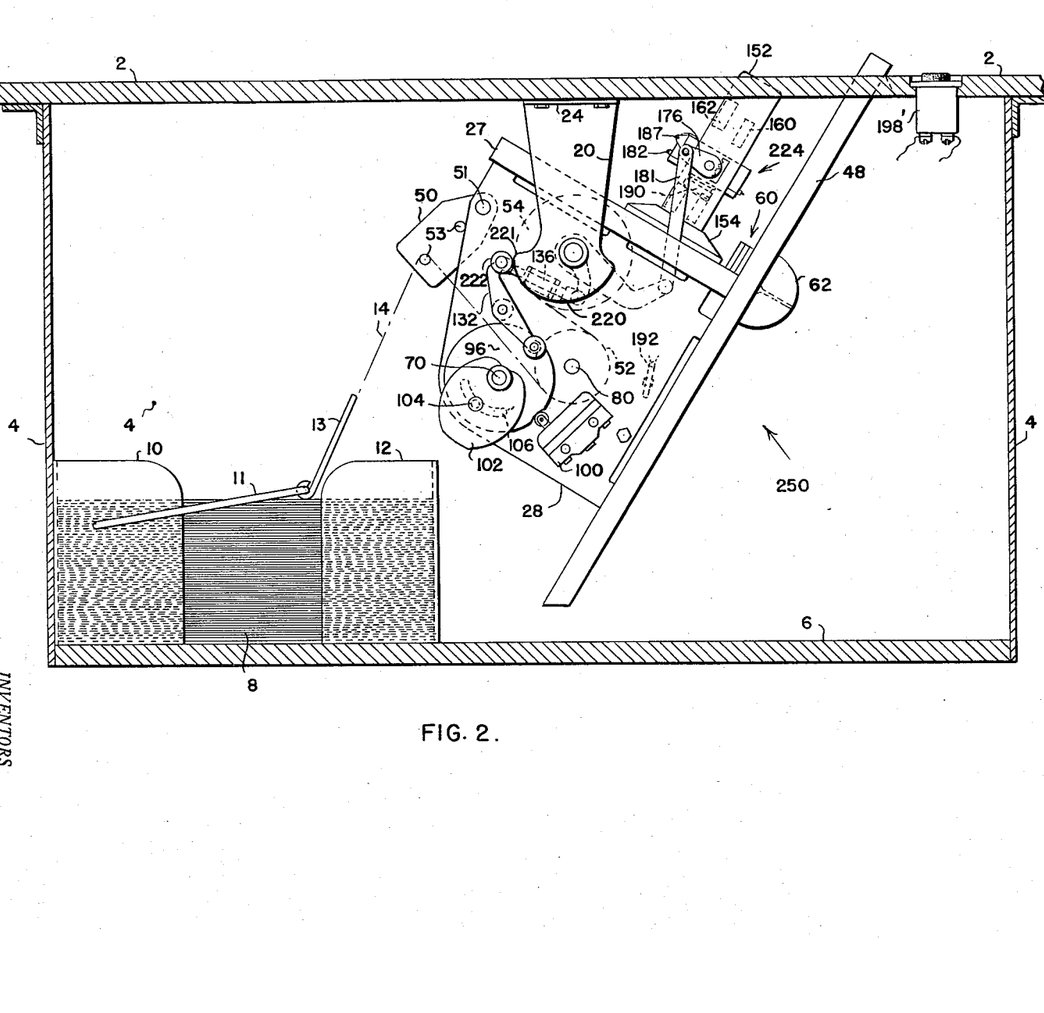
Figure 2 shows the apparatus of Figure 1 in an open position providing access to the interior thereof.

When it is desired to reload the label strip supply containers 10 and 12 or when it is desired to make a change in the printing plates, the entire imprinting apparatus may be rotated on the bushings 30 and 38 in hangers 18 and 20, respectively, to a position indicated generally at 250 in Figure 2. Normally rotation to this position is prevented by the latch means shown generally at 210. The latch assembly includes a pin 212 extending across a recess 211 provided in the insert 48 in the countertop. Mounted on the pin 212 is a member 216 having an extending tongue 213 which is adapted to engage a latch member 214 which engages a recess in the stationary countertop 2. The member 216 is in the form of a lifting ring which is adapted to be grasped by an operator. Upon lifting the lifting ring the latch member 214 is moved to the right, as viewed in Figure 7 thus releasing the latch from the countertop 2 and the operator can then rotate the entire imprinting assembly in the hangers 18 and 20 and position the assembly as shown in Figure 2.

The hanger 20 has the lower portion thereof contoured to provide a cam surface indicated at 220. The lever 132 mounts a cam follower 222 which is adapted to cooperate with the cam surface 220. When the imprinting apparatus is rotated to the position shown in Figure 2, the cam follower 222 moves to the end 221 of the cam 220. This actuation of the arm 132 provides rotation of the arm about the pivot 134 approximately equal to the rotation of the arm caused by the rotation of the cam 102 through 90° and, therefore, as indicated at 224 in Figure 2, the printing plate mounting means is in a mid position between its inking and its printing positions providing access for rotation of the rotatable plate carrying member and replacement of printing plates. When the imprinting assembly is rotated back to a normal position, the cam follower 222 returns to the position indicated in Figure 1 and the apparatus is in the normal at rest position.

The mercury switch 192 is mounted in such a position that the circuit therethrough is normally closed. However, it will be apparent that, from the position of the switch in Figure 2, when the imprinting apparatus has been rotated to provide access the mercury switch will be open. As shown in Figure 11, the open contact of the switch 192 will prevent operation of the driving motor and thus the apparatus cannot be set in motion while the plates are being changed or while a new label strip is being threaded into position in the apparatus.

In Figure 12 there is shown an embodiment of the method described herein in which the imprinting apparatus described above is employed in conjunction with means for printing specific indicia upon the labels of the strip after the labels have been printed with general indicia. In this figure there is shown generally at 16 the imprinting apparatus mounted below the table top 2. Above the table top a stationary platen 230 is provided. The label strip 16 is drawn up out of the storage bin and passes through the imprinting machine and the severed labels are presented in position in front of the stationary platen 230 in order to be printed upon by the specific indicia imprinting means indicated at 232 in the form of a calculating machine. A pair of guide strips 234 are provided in order to hold the severed label in position against the stationary platen 230.

The calculating machine 232 may be any of a number of standard and well known machines which include a bank of keys 236 which are depressed in order to actuate the calculating machine. Included with the machine is a group of type bars 238 which are adapted to move upwardly into a position determined by the keys depressed by the operator. When the operator has set the keys of the machine and desires to complete the printing operation, he will depress a main operating bar 240 which will initiate the operation of the machine. The main operating bar 240 is provided with a stem 242 as is conventional and attached to the stem is a contact bar 244 which is adapted to engage, when the key is depressed, a pair of contacts indicated at 198''. These contacts 198'' are substituted for the manually operated push button 198' shown in Figure 1 and provide a contact, as indicated at 198, in the wiring diagram shown in Figure 11.

Thus an operator who has the apparatus shown in Figure 12 positioned adjacent to, for example, a weighing scale will, upon reading the scale, determined the weight of the package of goods. Thereupon he will set up on the calculating machine the weight of the goods and the price per unit weight in order that the machine may calculate the total price of the goods. Thereafter, the operator will depress the operating bar which will cause the machine to print upon the label, as indicated in Figure 10, the weight of the goods, the unit price of the goods, the total price of the goods in the particular package which he is at that time weighing.

Alternately, a scale may be used which is provided with a drum giving the total price by direct reading in which case the machine 232 may be merely an imprinting machine. It will be evident that the specific indicia imprinting means can be used in conjunction with numerous types of goods measuring means and specific indicia imprinting means.

Simultaneously, with the operation of the specific indicia imprinting machine, the contact 198 having been closed, the general indicia imprinting machine will print on a label to be subsequently delivered to the specific indicia imprinting machine, the general indication of the class of goods being labelled. Thus there is provided a complete imprinting apparatus wherein general indicia and specific indicia are successively printed upon labels of the strip and in which actuation of the specific indicia imprinting apparatus initiates operation of the general indicia imprinting apparatus.

After the label has been printed with the specific indicia, the operator may grasp the upstanding portion 231 of the label which extends clear above the stationary platen 230 and withdraw the label from the apparatus and immediately apply the label to the specific package of goods which he is weighing.

As noted above, it will be evident that, while this apparatus has been described in connection with an imprinting calculating machine and goods measured by weight, the goods may be specifically measured or indicated, for example, in terms of number of articles, color, material or any other convenient measure. Similarly, the calculating machine shown in Figure 12 may be replaced by, for example, a printing and weighing scale and the label which has been printed with the general goods identifying indicia may be delivered directly to the imprinting apparatus of the weighing and printing scale. The invention has numerous applications and should not be construed as being limited to the combination of the imprinting apparatus and an imprinting calculating machine as are specifically shown in Figure 12.

It will be evident that in the apparatus described the motor 66 could be replaced by a hand crank and the apparatus manually driven. Alternately, a hand crank could be attached to an extension of the shaft 108 and the label advancing roller and the imprinting apparatus could thereby be actuated by the hand drive rather than by the motor drive. In this latter arrangement, the cutoff knife could be replaced by a tearing edge on the board 48.

Figure 13:
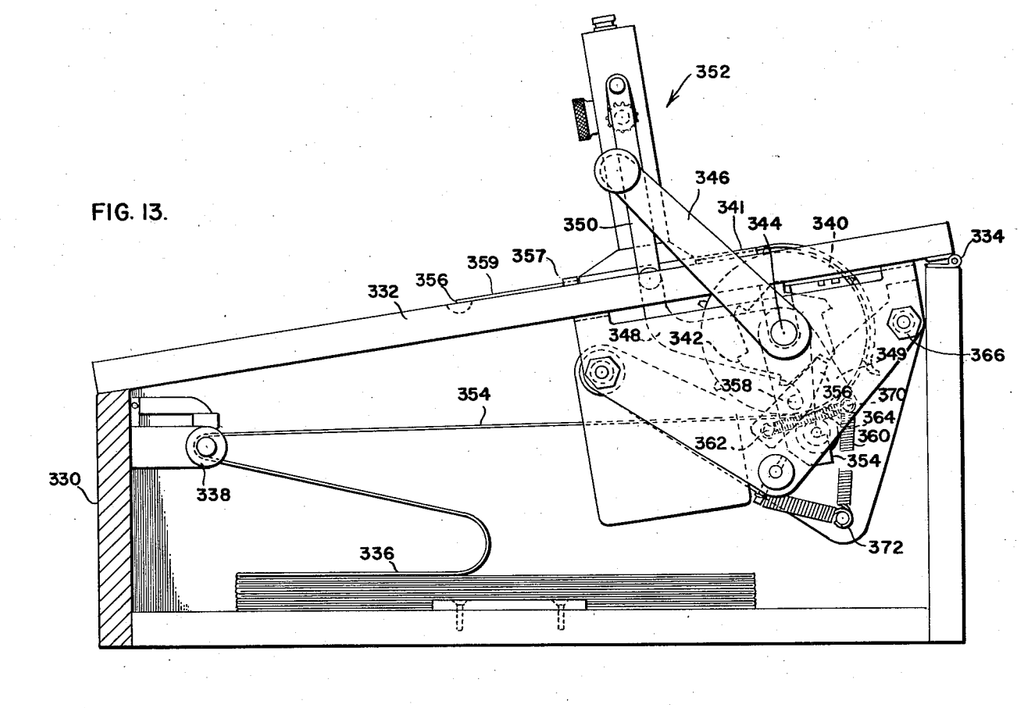
Figure 13 shows an alternate form of imprinting apparatus.

An embodiment of this latter form of apparatus is shown in Figure 13 in which a box structure 330 having a hinged lid 332 attached to one wall thereof by means of a hinge 334 contains a fan-folded label strip 336 which is adapted to pass over a guide roller 338 and over a pin carrying drum 340 having the same general construction as the pin drum 54. The pin drum includes a ratchet gear 342 attached to one end thereof. The pin drum 340 is rotatably mounted on a shaft 344 to which is attached a crank handle 346 which extends exteriorly of the box 330 and is adapted to be rotated by an operator.

In this arrangement, the label strip indicated at 354 passes around the pin drum 340, under a guide plate 341 and under imprinting means indicated generally at 352. The end 359 of the last label of the strip is positioned to be grasped by an operator and torn off against a tear-off plate 357.

Rigidly attached to the shaft 344 is a pair of arms 348 and 349 which are positioned one on each side of the pin drum 340 and are connected to upwardly extending links 350 which serve to actuate a printing mechanism indicated generally at 352 which is identical to that indicated at 58 and described in conjunction with Figures 3 and 7. A lever 354 is freely mounted on the shaft 344. A pawl 356 is pivotally mounted on the lever 354 by means of a pin 358. One end of a spring 364 is connected to a pin 362 mounted on the end of the pawl 356. The other end of the spring is attached to a pin 370 mounted on an extension of the arm 348.

When the crank lever 346 is moved in a counterclockwise direction as viewed in Figure 13, the shaft 344 and the arms 348 and 349 will be rotated in a counterclockwise direction and the spring 364 will pull the pawl 356 into engagement with the ratchet gear 344 thereby rotating the pin wheel 340. This rotation will continue until the end of the arm 354 passes through approximately 60° of rotation and contacts a stop bar 366. Thereafter further rotation of the crank lever 346 will result in an extension of the spring 364.

The arms 348 and 349 and the links 350 are so proportioned that the imprinting mechanism shown generally at 352 which is identical to that hereinbefore described is at this stage positioned with its printing plates in contact with the label strip 359. Thus, at the instant of contact of the printing plates with the label strip there is no rotation of the pin drum 340.

After the printing is accomplished, the operator may release the crank handle 346 and a spring 360 connected between a stationary pin 372 and the pin 370 affixed to an extension of the arm 349 will cause the shaft 344 to rotate in a clockwise direction thereby returning the apparatus to the at rest position shown in Figure 13.

Upon completion of a manually actuated imprinting operation, the printing plate carrying member will be in the uppermost position permitting an operator to grasp the extended edge 356 of the printed label and tear it off against the tear-off edge 357 in a conventional manner.

The apparatus and method described provide for printing on labels of a preprinted label strip general indicia relating to the general type of goods to which a series of labels are being applied and specific indicia relating to the specific goods to which each specific label is applied and to printing the general and specific indicia on the labels immediately prior to their application to the goods. This invention permits a packager to accomplish his packaging with a single stock of labels and to print necessary goods identifying indicia on these labels immediately prior to their application to the goods.

Thus, for example, in the food merchandising business, it is unnecessary for a packager to stock labels preprinted with designations of each type of food to which he applies the label. Similarly, a hardware packager may have a stock of labels which are preprinted with only the name of the manufacturer and it is not necessary to have labels preprinted for nuts, bolts, washers, rivets, etc. It will be evident that this invention permits a great saving in time, storage and labor on the part of a packager and, furthermore, the invention reduces the possibility of error, mistake or confusion in the application of labels to the goods. Additionally, the invention permits application to the labels of coding, a date, or, as indicated in Figure 10, the day of the week on which the labels are applied to the goods.

It will be evident that the method and apparatus described herein can be employed in conjunction with numerous types of electronic sorters or a variety of other types of apparatus known to the art for grouping goods for distribution and sale. It will also be evident that various modifications may be made in the embodiment of the invention described herein including such modifications as employing a label strip in roll form and various modifications of arrangement and formation of parts without departing from the scope of the invention as set forth in the following claims.

What is claimed is:

1. Label imprinting apparatus for printing labels adapted to identify goods with indicia identifying the goods to which the labels are applied, said apparatus comprising means for storing a plurality of labels in strip form, means for successively printing on each of the labels general goods identifying indicia relating to the type of goods to which the labels are being applied, means for actuating said general indicia printing means, means for advancing the label strip past said imprinting means, means following said first mentioned printing means along the path of label advance for successively printing on each of the labels specific indicia relating to the specific goods to which each label is applied, means for actuating said specific indicia printing means, and means responsive to actuation of said specific indicia imprinting means for initiating operation of said means for actuating said general indicia imprinting means and said advancing means.

2. Label imprinting apparatus for printing labels adapted to be applied to goods with general indicia identifying the type of goods labelled, said apparatus being adapted to be positioned in association with apparatus for printing on each label specific indicia relating to the specific goods to which each label is applied and said apparatus comprising means for storing a plurality of labels in strip form, imprinting means for successively printing on each of the labels general goods identifying indicia relating to the type of goods to which the labels are being applied, means for advancing the label strip past said imprinting means, means for severing from the strip labels printed with general goods identifying indicia, means for actuating said imprinting means and said advancing means, means for positioning severed labels printed with general goods identifying indicia in a position to be received by said associated specific indicia imprinting apparatus, and means responsive to operation of said associated specific indicia printing apparatus for initiating operation of said actuating means.

3. Label imprinting apparatus for printing labels adapted to identify goods with indicia identifying the goods to which the labels are applied, said apparatus comprising means for storing a label strip, means for successively printing on label forming successive areas of said label strip general goods identifying indicia relating to the type of goods to which the label forming areas are applied, means for actuating said general indicia printing means, means for advancing the strip past said imprinting means, means following said first mentioned printing means along the path of strip advance for successively printing on each of said areas specific indicia relating to the specific goods to which each label forming area is applied, means for actuating said specific indicia printing means, and means responsive to actuation of said specific indicia imprinting means for initiating operation of said means for actuating said general indicia imprinting means and said advancing means.

4. Label imprinting apparatus for printing labels adapted to be applied to goods with general indicia identifying the type of goods labelled, said apparatus being adapted to be positioned in association with apparatus for printing on each label specific indicia relating to the specific goods to which each label is applied and said apparatus comprising means for storing a label strip, imprinting means for successively printing on label forming successive areas of said label strip general goods identifying indicia relating to the type of goods to which the label forming areas are applied, means for advancing the strip past said imprinting means, means for severing from the strip label forming areas printed with general goods identifying indicia, means for actuating said imprinting means and said advancing means, means for positioning severed labels printed with general goods identifying indicia in a position to be received by said associated specific indicia imprinting apparatus, and means responsive to operation of said associated specific indicia printing apparatus for initiating operation of said actuating means.

5. Label imprinting apparatus for printing labels adapted to identify goods with indicia identifying the goods to which the labels are applied, said apparatus comprising an enclosure containing means for storing a label strip, means for successively printing on label forming successive areas of said label strip general goods identifying indicia relating to the type of goods to which the label forming areas are applied and means for actuating said general indicia printing means, and means positioned externally of said enclosure and following said first mentioned printing means along the path of strip advance for successively printing on each of said areas specific indicia relating to the specific goods to which each label forming area is applied, means for actuating said specific indicia printing means, and means responsive to actuation of said specific indicia imprinting means for initiating operation of said means for actuating said general indicia imprinting means and said advancing means.

6. Label imprinting apparatus for printing labels adapted to identify goods with indicia identifying goods to which the labels are applied, said apparatus comprising an enclosure containing means for storing a label strip, means for successively printing on label forming successive areas of said label strip general goods identifying indicia relating to the type of goods to which the label forming areas are applied, means for severing label forming areas bearing general goods identifying indicia, means for actuating said general indicia printing means and said severing means, and means for advancing the strip past said imprinting means and said severing means and positioning a severed label externally of said enclosure, and means positioned externally of said enclosure adapted to receive said externally positioned label for successively printing on each label specific indicia relating to the specific goods to which each label is applied, means for actuating said specific indicia printing means, and means responsive to actuation of said specific indicia imprinting means for initiating operation of said means for actuating said general indicia imprinting means and said advancing means.

7. The method of printing labels adapted to identify goods with indicia relating to the goods to which the labels are applied, said method comprising storing a label strip, printing on each of successive label forming areas of the strip general goods identifying indicia relating to the type of goods to which the labels are applied, successively thereafter printing on each of the label forming areas of the strip specific goods identifying indicia relating to the specific goods to which each label is applied, advancing the label strip between printing operations, and initiating said general indicia printing and said strip advancing in response to actuation of said specific indicia printing.

8. The method of printing labels adapted to be applied to goods with general indicia identifying the type of goods to be labeled, said method comprising storing a label strip, printing on each of successive label forming areas of the strip goods identifying indicia relating to the type of goods to which the labels are applied, advancing the strip between printing operations, severing from the strip label forming areas printed with general goods identifying indicia, positioning severed labels printed with general goods identifying indicia in a position to be received by associated specific indicia printing apparatus, and initiating said general goods identifying printing and said strip advance and severing in response to operation of the associated specific indicia printing apparatus.

References Cited in the file of this patent

UNITED STATES PATENTS

| | | |
|---|---|---|
| 532,064 | Hoop | Jan. 8, 1895 |
| 640,449 | Cressler | Jan. 2, 1900 |
| 679,627 | Leavy | July 1, 1901 |
| 983,872 | Brown | Feb. 14, 1911 |
| 1,208,642 | Pitney | Dec. 12, 1916 |
| 1,224,813 | Trew | May 1, 1917 |
| 1,299,689 | Deming | Apr. 8, 1919 |
| 1,419,345 | Wright | June 13, 1922 |
| 1,726,541 | Cole | Sept. 3, 1929 |
| 1,786,867 | Rosenthal | Dec. 30, 1930 |
| 1,916,985 | Ogsbury | July 4, 1933 |
| 2,085,655 | Harris | June 29, 1937 |
| 2,301,198 | Brenn | Nov. 10, 1942 |
| 2,405,373 | Seeley | Aug. 6, 1946 |
| 2,454,025 | Amend | Nov. 16, 1948 |
| 2,608,156 | Gilthorpe | Aug. 26, 1952 |